US012007715B1

(12) United States Patent
Yoshida et al.

(10) Patent No.: US 12,007,715 B1
(45) Date of Patent: Jun. 11, 2024

(54) IMAGE FORMING APPARATUS

(71) Applicant: Toshiba Tec Kabushiki Kaisha, Tokyo (JP)

(72) Inventors: Masafumi Yoshida, Sunto Shizuoka (JP); Takashi Ogiwara, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/189,088

(22) Filed: Mar. 23, 2023

(51) Int. Cl.
*G03G 21/20* (2006.01)
*G03G 15/00* (2006.01)
*G03G 15/01* (2006.01)
*G03G 15/06* (2006.01)

(52) U.S. Cl.
CPC ......... *G03G 21/20* (2013.01); *G03G 15/0121* (2013.01); *G03G 15/065* (2013.01); *G03G 15/5033* (2013.01); *G03G 2215/0103* (2013.01)

(58) Field of Classification Search
CPC ............. G03G 15/0121; G03G 15/065; G03G 15/5033; G03G 21/20; G03G 2215/0103
See application file for complete search history.

(56) References Cited

U.S. PATENT DOCUMENTS 9,057,985 B2 * 6/2015 Tanaka ............... G03G 15/0848
2006/0120736 A1 6/2006 Kakuno et al.
2016/0116877 A1 * 4/2016 Matsushita ............ G03G 21/20 399/53
2020/0301358 A1 * 9/2020 Haruta ................ G03G 15/757

FOREIGN PATENT DOCUMENTS

JP 2013-052571 A 3/2013

* cited by examiner

*Primary Examiner* — Joseph S Wong
(74) *Attorney, Agent, or Firm* — FOLEY & LARDNER LLP

(57) ABSTRACT

An image forming apparatus includes multiple developing devices, a temperature sensor, and a controller. The multiple developing devices are configured to respectively develop electrostatic latent images formed on an image carrier and correspond to multiple colors. The temperature sensor is configured to measure a temperature of a first developing device of the multiple developing devices that develops at least a first color of the multiple colors. The controller includes a processor and a memory. The controller is configured to: stop development performed by the first developing device based on the measured temperature of the first developing device; and operate a second developing device of the multiple developing devices to perform development when the first developing device is stopped.

20 Claims, 13 Drawing Sheets

IMAGE FORMING APPARATUS

FIELD

Embodiments described herein relate generally to an image forming apparatus.

BACKGROUND

Multifunction printers and multifunction peripherals (MFP) can be used in offices and the like. A laser printer using toner has a developing device, and transfers the toner stirred in the developing device to a photoconductor member to form a toner image. The printing speed of recent multifunction printers has been increased. Along with this increase in speed, the driving speed for stirring the toner also increases. If the driving speed increases, the temperature inside the machine rises due to the accompanying energy loss and frictional heat generated if the developer is scraped off by the developing roller.

If the toner is affected by heat, the toner sticks to the toner and becomes fixed. If printing is performed in this state, the fixed toner is caught by the developing blade of the developing device, which can cause a blank image or white spot image.

For this reason, if the temperature inside the machine body rises during printing, the multifunction printer performs intermittent printing in which the printing operation and stop are repeated. If intermittent printing is stopped and the temperature inside the machine body drops, the multifunction printer restarts printing.

However, intermittent printing may take time until printing is completed. In other words, intermittent printing can prolong a printing operation.

DETAILED DESCRIPTION

In some embodiments, an image forming apparatus includes a plurality of developing devices, a temperature acquisition unit, and a development control unit. The plurality of developing devices are provided corresponding to a plurality of colors and respectively develop electrostatic latent images formed on an image carrier. The temperature acquisition unit acquires a temperature of a specific developing device that develops at least a specific color among the plurality of developing devices. The development control unit stops development performed by the specific developing device based on the temperature of the specific developing device acquired by the temperature acquisition unit, and causes another developing device other than the specific developing device to perform development during the stop.

Figure 1:
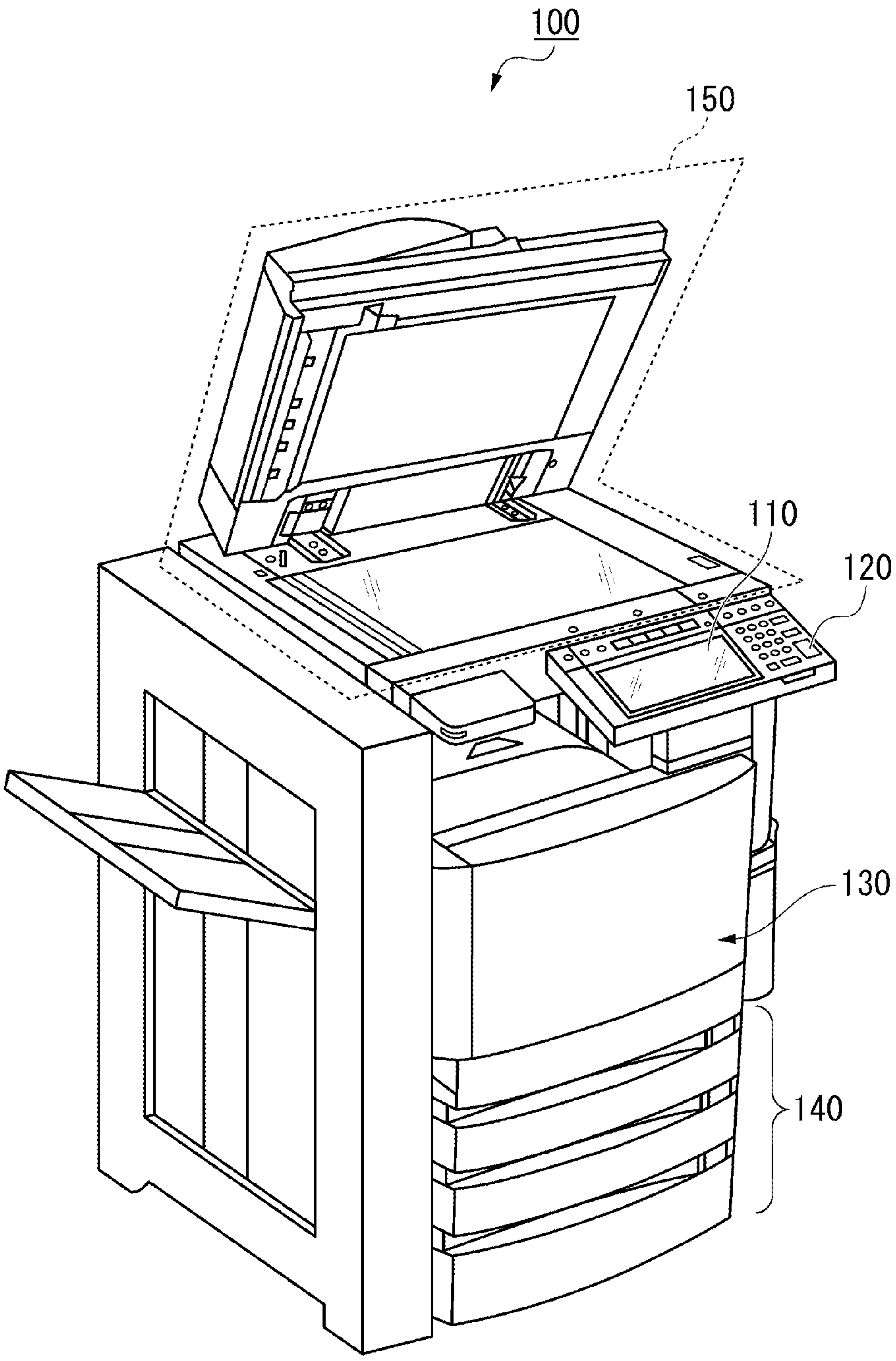
FIG. 1 is an external view illustrating an image forming apparatus, according to some embodiments.

FIG. 1 is an external view illustrating an overall configuration example of an image forming apparatus 100, according to some embodiments. The image forming apparatus 100 is, for example, a multifunction machine. The image forming apparatus 100 includes a display 110 (e.g., a screen, a display device, etc.), a control panel 120 (e.g., a user interface), a printer 130 (e.g., a print head system), a sheet accommodation unit 140 (e.g., a printer tray system, and an image reading unit 150 (e.g., scanner, scanning unit, copier, photo copier, etc.).

Figure 4:
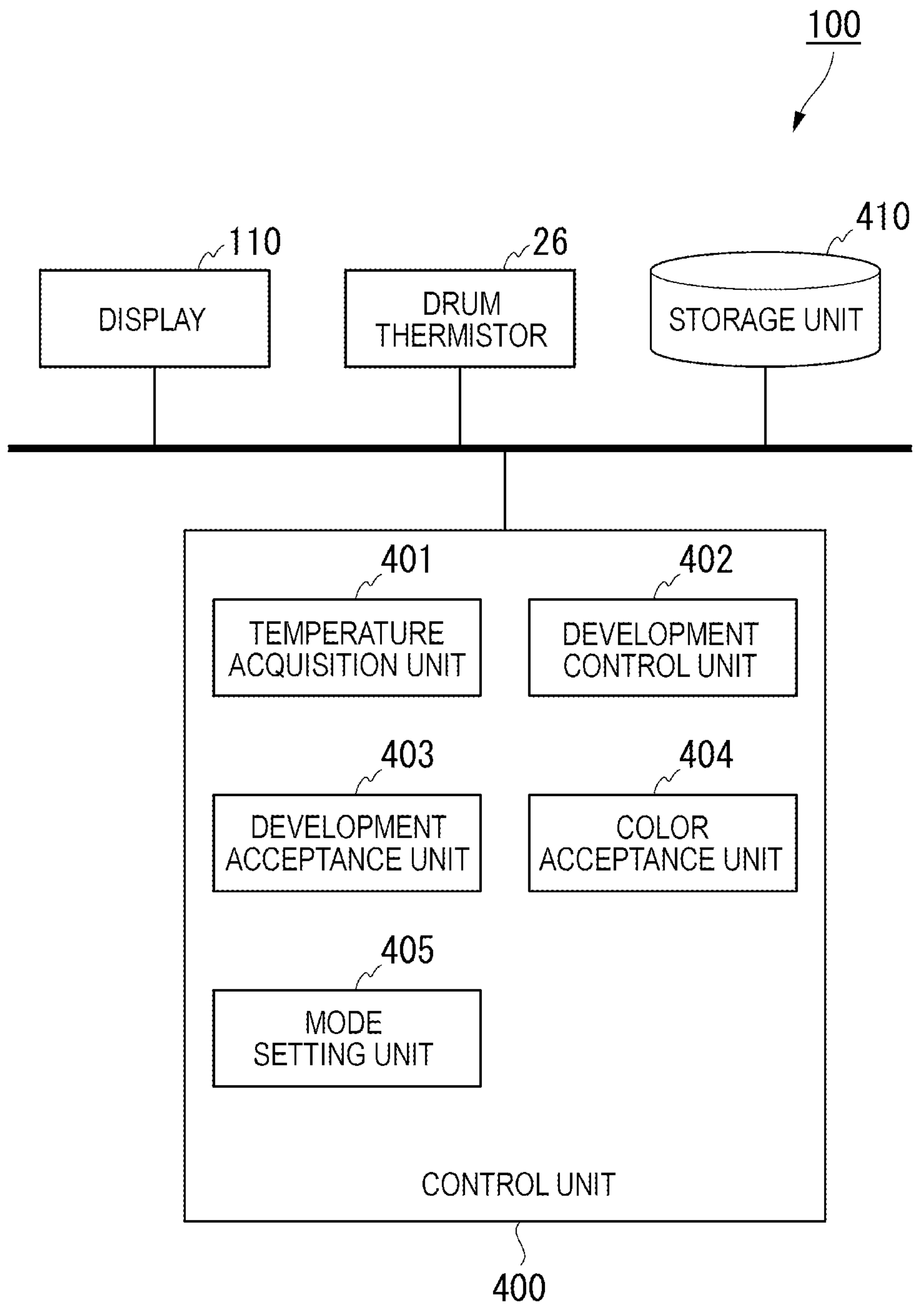
FIG. 4 is a block diagram illustrating the image forming apparatus of FIG. 1, according to some embodiments.

The display 110 is, for example, a liquid crystal display with a touch panel (e.g., a touch sensitive surface). The display 110 displays various information (e.g., via screens of a graphical user interface presented on the display 110). In addition, the display 110 accepts an operation (e.g., a user input, a command, a message, etc.) from the user. The display 110 displays various operation screens, image states, operation status of each function, and the like according to control signals output from the control unit 400 (FIG. 4).

The control panel 120 includes various operation keys (e.g., buttons, user input devices, actuators, touch sensitive surfaces, etc.) such as numeric keys and a start key. The control panel 120 accepts various input operations from the user (e.g., touch inputs, commands, etc.). Further, the control panel 120 outputs operation signals to the control unit 400 (e.g., controller, microprocessor, processing circuit, etc.) according to various input operations accepted (e.g., received, input, etc.) from a user (e.g., via a user input device).

The printer 130 performs a series of printing operations using, for example, various information output from the display 110, the control panel 120, the image reading unit 150, and the like. A series of printing operations includes, for example, the following operations: inputting image information, forming an image, transferring a formed image to a sheet, and/or conveying the sheet.

The sheet accommodation unit 140 (e.g., sheet accommodation assembly, printer paper hopper system, print medium feeder system, etc.) includes a plurality of sheet cassettes (e.g., sheet trays, paper trays, etc.). Each sheet cassette accommodates a sheet (e.g., a sheet of printer paper, a sheet of print medium, a roll of print medium, paper, one or more reams of paper, etc.).

The image reading unit 150 includes an (at least partially) automatic document feeding device and a scanner device. The document feeding device sends (e.g., transfers, transports, etc.) the original document placed on the document tray out to the scanner device. The scanner device optically scans the original document on a document glass table (e.g., a scanner surface, platen glass scan surface, etc.), and forms an image of light reflected from the original document on a light receiving surface of a charge coupled device (CCD) sensor. Thereby, the scanner device reads the original document image on the document glass table. The image reading unit 150 generates image information (e.g., a group of image data that collectively carries a logical meaning) using the reading result read by the scanner device.

Figure 2:
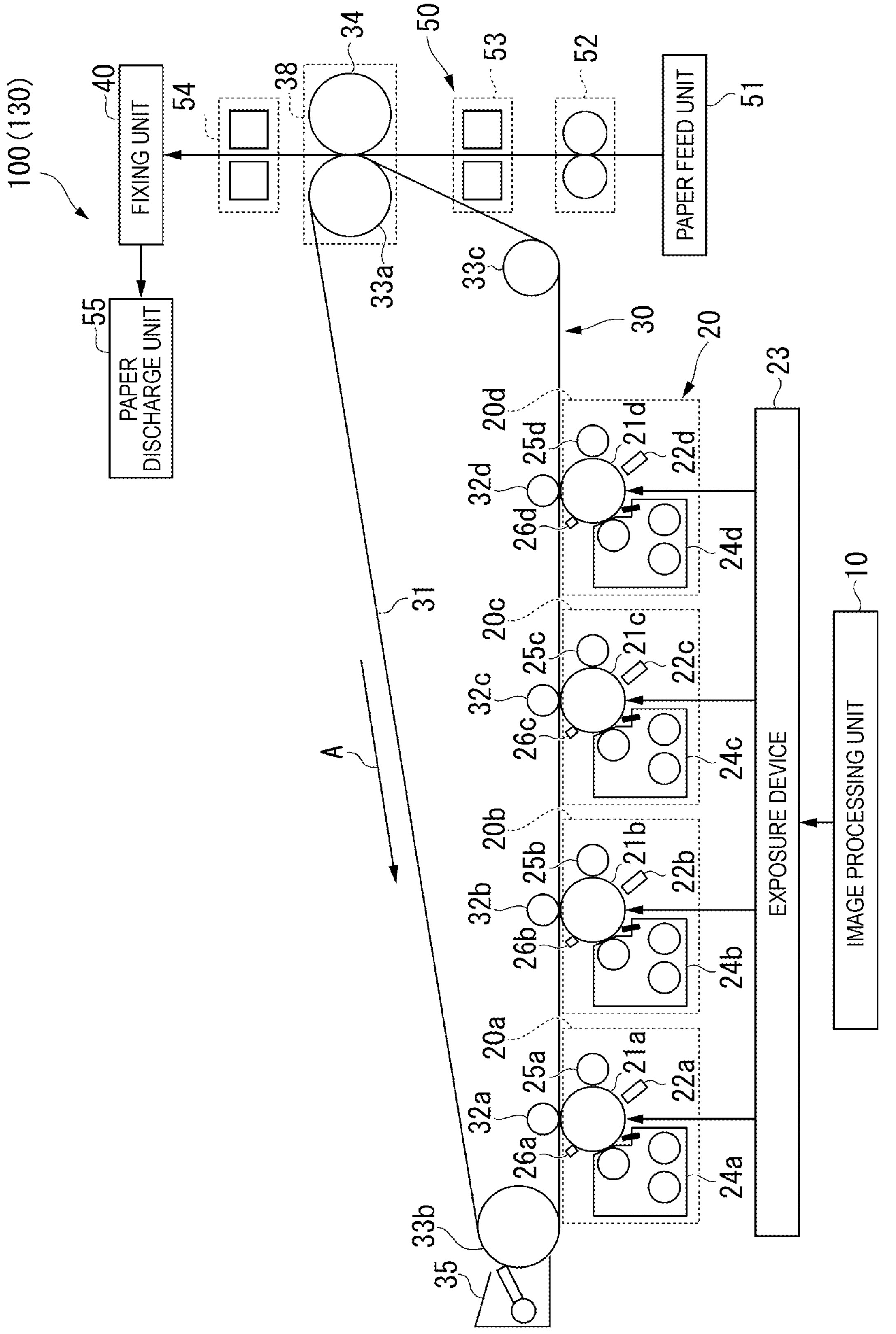
FIG. 2 is a view illustrating an internal configuration of the image forming apparatus of FIG. 1, according to some embodiments.

FIG. 2 shows an example of an internal configuration of the image forming apparatus 100, according to some embodiments. As illustrated in FIG. 2, the image forming apparatus 100 (printer 130) has four image forming units 20*a* to 20*d* arranged in parallel. The image forming apparatus 100 may be a quadruple tandem image forming apparatus. The image forming apparatus 100 includes an image processing unit 10, image forming units 20 (20*a* to 20*d*), an intermediate transfer unit 30, a fixing device 40, and a sheet conveying unit 50.

The image processing unit 10 inputs image information. The image information to be input is image information generated by the image reading unit 150 (FIG. 1) or image information transmitted from another device. The image processing unit 10 performs digital image processing for processing input image information in accordance with initial settings or user settings. For example, digital image processing includes gradation correction based on gradation correction data. In addition to gradation correction, digital image processing includes various types of correction processing such as color correction and shading correction, and processing such as compression with respect to the image data.

The image forming units 20 are, for example, four image forming units shown as image forming units 20*a*, 20*b*, 20*c*, 20*d*, and the image forming units 20 may each correspond to a color (e.g., one of four colors). For example, the image forming unit 20*a* is a unit corresponding to Y color (yellow). For example, the image forming unit 20*b* is a unit corresponding to M color (magenta). For example, the image forming unit 20*c* is a unit corresponding to C color (cyan). For example, the image forming unit 20*d* is a unit corresponding to K color (black).

The image forming units 20*a* to 20*d* include photoconductor drums 21*a* to 21*d*, charging devices 22*a* to 22*d*, an exposure device 23, developing devices 24*a* to 24*d*, drum cleaning devices 25*a* to 25*d*, and drum thermistors 26*a* to 26*d*, respectively. In the following description, reference numerals suffixes (e.g., a, b, c, d) may be omitted.

Next, with reference to FIG. 3, the image forming unit 20 (image forming units 20*a* to 20*d*) will be described in detail, according to some embodiments.

Figure 3:
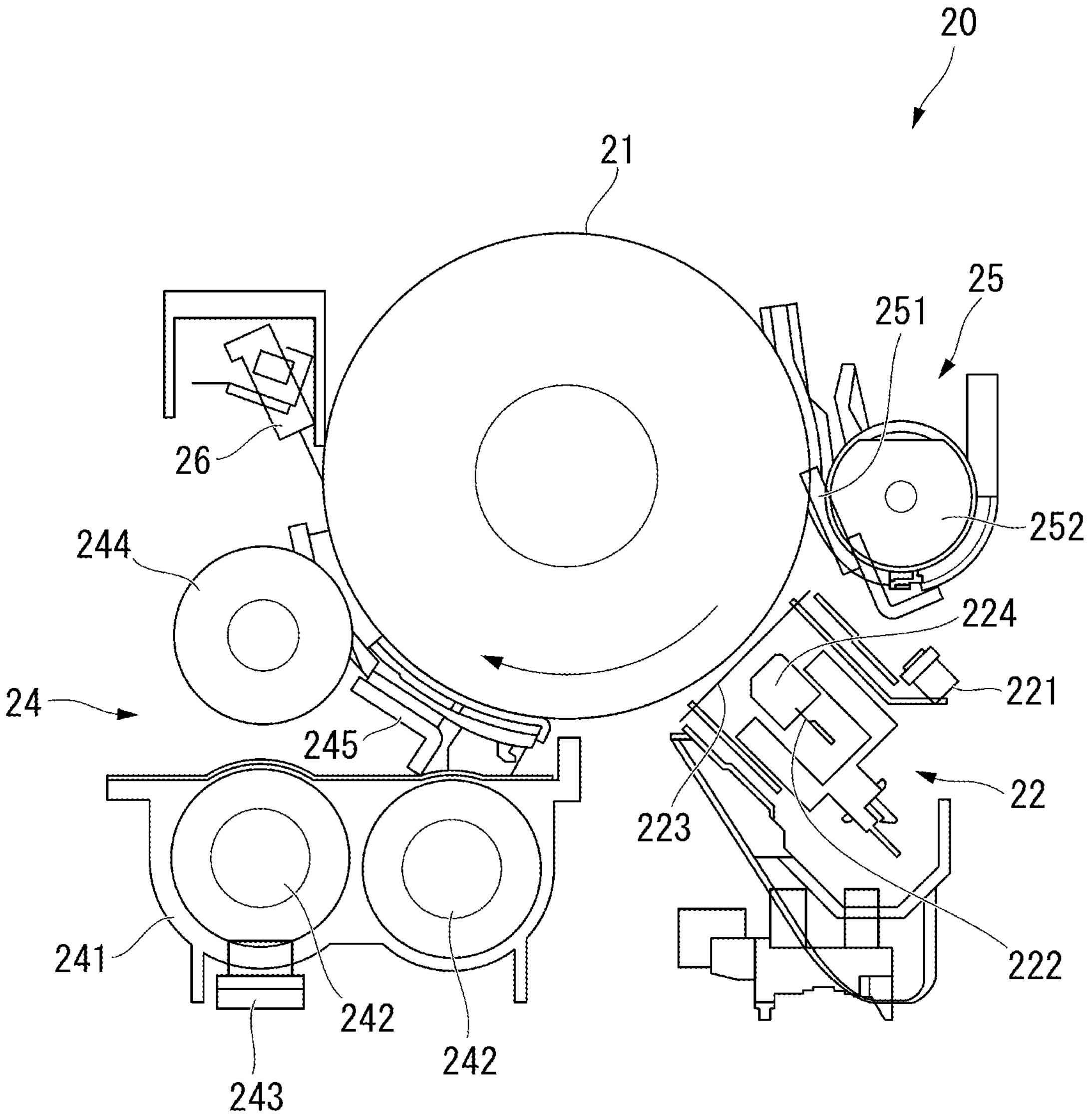
FIG. 3 is a view illustrating an image forming unit of the image forming apparatus of FIG. 1, according to some embodiments.

FIG. 3 is a view illustrating an example of the image forming unit 20, according to some embodiments.

The photoconductor drum 21 is an example of an image carrier. The photoconductor drum 21 is, for example, a charge-type organic photo-conductor (OPC) in which an undercoat layer, a charge generation layer, and a charge transport layer are sequentially laminated on the peripheral surface of a conductive cylindrical body made of aluminum. The photoconductor drum 21 has photoconductivity.

The charging device 22 includes a destaticizing light emitting diode (LED) 221, a needle electrode 222, a grid 223, and a needle electrode cleaner 224.

The destaticizing LED 221 destaticizes the surface of the photoconductor drum 21. For example, the destaticizing LED 221 irradiates the surface of the photoconductor drum 21 with light. As a result, the electrical resistance of the surface of the photoconductor drum 21 decreases, the charge remaining on the surface is reduced or eliminated, and the potential of the surface before charging becomes approximately constant.

The needle electrode 222 discharges toward the photoconductor drum 21. For example, the needle electrode 222 ionizes (charges) the surrounding air and causes the ionized air to flow over the surface of the photoconductor drum 21. As a result, the surface of the photoconductor drum 21 is charged.

The grid 223 controls the amount of charge on the surface of the photoconductor drum 21 by applying a control bias if charging is performed by the needle electrode 222.

The needle electrode cleaner 224 removes dirt adhering to the needle electrode 222.

The exposure device 23 is, for example, a device that irradiates a semiconductor laser. For example, the exposure device 23 irradiates the photoconductor drum 21 with laser light corresponding to the image of each color component. If the exposure device 23 irradiates the photoconductor drum 21 with laser light, the potential of the area irradiated with the laser light among the areas of the surface of the photoconductor drum 21 changes. This potential change (potential difference) forms an electrostatic latent image on the surface of the photoconductor drum 21.

The developing device 24 includes a developer containing unit 241, a mixer 242, a toner density sensor 243, a developing roller 244, and a developing blade 245.

The developer containing unit 241 contains the developer therein. For the developer, for example, a two-component developer is used. A two-component developer includes a toner and a carrier. For the carrier, for example, iron powder with a particle size of several tens of μm or polymer ferrite particles are used. However, the developer is not limited to the two-component developer, and it is also possible to use a one-component developer that does not use a carrier.

The mixer 242 stirs the two-component developer contained in the developer containing unit 241 to homogenize the toner and carrier of the two-component developer. For example, the mixer 242 causes, for example, the carrier to be positively charged and the toner to be negatively charged by friction between the carrier and the toner through stirring. The carrier and the toner adhere to each other due to the electrostatic force caused by this charging.

The toner density sensor 243 detects the toner density in the developer containing unit 241. The toner density sensor 243 is provided at the bottom portion of the developer containing unit 241. The toner density sensor 243 detects the magnetic permeability that correlates with the toner density, and performs a sensor output corresponding to the magnetic permeability (toner density). Note that if the toner in the developer containing unit 241 runs short, toner is replenished to the developer containing unit 241 from the sub-hopper.

The developing roller 244 is an aluminum roller and has a magnet inside. The developing roller 244 attracts the developer with this magnet and conveys the developer to the photoconductor drum 21.

The developing blade 245 restricts the amount of developer conveyed by the developing roller 244 to form a toner layer with a constant thickness on the surface of the photoconductor drum 21. Thereby, the electrostatic latent image formed on the surface of the photoconductor drum 21 is visualized (developed).

Hereinafter, the developing device 24$a$ is referred to as the "Y-color developing device 24$a$", the developing device 24$b$ is referred to as the "M-color developing device 24$b$", the developing device 24$c$ is referred to as the "C-color developing device 24$c$", and the developing device 24$d$ is referred to as "K-color developing device 24$d$", in some cases.

The drum cleaning device 25 has a cleaning blade 251 and a containing unit 252.

The cleaning blade 251 comes into contact with the surface of the photoconductor drum 21 and removes residual toner remaining on the surface of the photoconductor drum 21 after the primary transfer.

The containing unit 252 contains (collects) the removed residual toner.

In addition, a drum thermistor 26 is provided above the developing device 24. The drum thermistor 26 is an example of a temperature detection unit. The drum thermistor 26 is disposed downstream of the developing device 24 in the moving direction of the photoconductor drum 21. The drum thermistor 26 is disposed to face the photoconductor drum 21 and is disposed in contact with the surface of the photoconductor drum 21. The drum thermistor 26 detects the temperature of the surface of the photoconductor drum 21. Note that the drum thermistor 26 is not limited to being disposed in all the image forming units 20 (20$a$ to 20$d$), and may be disposed in at least one image forming unit 20. For example, the drum thermistor 26 may be disposed in the black image forming unit 20$d$.

Next, with reference to FIG. 2, the intermediate transfer unit 30 will be described. The intermediate transfer unit 30 includes an intermediate transfer member 31, a primary transfer roller 32, a plurality of support rollers 33, a secondary transfer roller 34, a belt cleaning device 35, and the like.

The intermediate transfer member 31 is, for example, an endless belt (transfer belt). The intermediate transfer member 31 has conductivity and elasticity.

The support rollers 33$a$ to 33$c$ support the intermediate transfer member 31 such that the intermediate transfer member 31 is tensioned. Thereby, the intermediate transfer member 31 is formed in a loop shape. Any one of the plurality of support rollers 33$a$ to 33$c$ (for example, support roller 33$c$) is a driving roller. Rollers other than the driving roller are driven rollers. By driving and rotating the driving roller, the intermediate transfer member 31 travels in the A direction at a predetermined speed at a predetermined cycle.

Here, the direction in which the intermediate transfer member 31 moves can be defined as an upstream direction and a downstream direction. For example, the direction in which the intermediate transfer member 31 moves can be defined with the image forming unit 20$a$ being the most upstream and the belt cleaning device 35 being the most downstream.

The primary transfer roller 32 is disposed to face the photoconductor drum 21 with the intermediate transfer member 31 interposed therebetween. For example, the primary transfer roller 32 is disposed to apply pressure to the photoconductor drum 21 with the intermediate transfer member 31 interposed therebetween. As a result, the primary transfer roller 32 and the photoconductor drum 21 form a primary transfer unit that nips the intermediate transfer member 31.

If the intermediate transfer member 31 passes through this primary transfer unit, the toner image formed on the photoconductor drum 21 is transferred onto the intermediate transfer member 31. A primary transfer bias is applied to the primary transfer roller 32 if the intermediate transfer member 31 passes through the primary transfer unit. For example, the primary transfer roller 32 is, for example, charged with a polarity opposite to that of the toner. Thereby, the toner image formed on the photoconductor drum 21 is electrostatically transferred to the intermediate transfer member 31.

The secondary transfer roller 34 is disposed to face the support roller 33$a$ with the intermediate transfer member 31 interposed therebetween. For example, the secondary transfer roller 34 is disposed to sandwich the intermediate transfer member 31 and apply pressure to the support roller 33$a$.

As a result, the secondary transfer roller 34 and the support roller 33$a$ form a secondary transfer unit 38 that nips the intermediate transfer member 31 and the sheet.

If the sheet passes through the secondary transfer unit 38, the toner image on the intermediate transfer member 31 is transferred onto the sheet. If the sheet passes through the secondary transfer unit 38, a secondary transfer bias is applied to the support roller 33$a$. For example, the support roller 33$a$ is charged with the same polarity as the toner.

As a result, the toner image on the intermediate transfer member 31 is electrostatically transferred to the sheet. In addition, the secondary transfer roller 34 and the support roller 33$a$ are configured to be separated from each other. Accordingly, if a sheet is jammed in the secondary transfer unit 38, the user can remove the sheet.

The belt cleaning device 35 has a cleaning blade that is in contact with the surface of the intermediate transfer member 31. The cleaning blade removes residual toner remaining on the surface of the intermediate transfer member 31 after secondary transfer. The removed residual toner is collected in a containing unit of the belt cleaning device 35.

The fixing device 40 heats and pressurizes the sheet onto which the toner image was transferred. As a result, the toner image transferred to the sheet is fixed onto the sheet. In addition, the fixing device 40 may employ a method of fixing the toner image to the sheet by heating through a film-like member.

Next, the sheet conveying unit 50 will be described. The sheet conveying unit 50 has a paper feed unit 51, a registration unit 52, a first guide unit 53, a second guide unit 54, and a paper discharge unit 55.

The paper feed unit 51 conveys the sheets accommodated in the sheet accommodation unit 140 one by one to the registration unit 52. The registration unit 52 stops the sheet conveyed from the paper feed unit 51 and sends the sheet out toward the secondary transfer unit 38 at a predetermined timing. The predetermined timing is the timing at which the toner image formed on the intermediate transfer member 31 is secondarily transferred.

The first guide unit 53 restricts the conveying direction of the sheet sent out from the registration unit 52. Further, the first guide unit 53 sends the sheet out, the conveying direction of which is restricted, to the secondary transfer unit 38.

The secondary transfer unit 38 transfers the toner image onto the sheet, the conveying direction of which is restricted by the first guide unit 53. Further, the secondary transfer unit 38 sends the sheet out, onto which the toner image was transferred, toward the fixing device 40.

The second guide unit 54 restricts the conveying direction of the sheet sent out from the secondary transfer unit 38. The fixing device 40 heats and pressurizes the sheet, the conveying direction of which is restricted by the second guide unit 54, and sends the sheet out to the paper discharge unit 55. The paper discharge unit 55 sends out the sheet to the discharge tray.

Here, the image forming apparatus 100 performs printing at high speed (e.g., rapid printing). Along with this increase in speed, the driving speed for stirring the toner also increases. If the driving speed increases, the temperature inside the machine body (inside the image forming apparatus 100) rises due to accompanying energy loss and frictional heat generated if the developer is scraped off by the developing roller 244 (FIG. 3). In addition to this, the temperature rise in the machine body may be caused by the influence of the heating temperature of the fixing device 40 or the influence of the sheet temperature due to the heated sheet passing through the secondary transfer unit 38 again during double-sided printing.

If the toner is affected by heat, the toner sticks to the toner (e.g., sticks to itself) and becomes fixed (e.g., bound up, etc.). If printing is performed in this state, the fixed toner is caught by the developing blade 245 (FIG. 3) of the developing device 24, resulting in a blank image or white spot image.

Therefore, the image forming apparatus 100 can optionally perform intermittent printing in which the printing operation and stop are repeated if the temperature inside the machine body increases during printing. When intermittent printing is stopped and the temperature inside the machine body drops, the image forming apparatus 100 restarts printing.

However, intermittent printing may take time until printing is completed, cause downtime, and reduce print efficiency. For this reason, the convenience for the user is impacted and may be low in some cases.

Therefore, the image forming apparatus 100, improves convenience of the user. Hereinafter, using FIG. 4, the functional configuration of the image forming apparatus 100 according to some embodiments will be described.

FIG. 4 is a block diagram illustrating a functional configuration of the image forming apparatus 100, according to some embodiments. In FIG. 4, the image forming apparatus 100 includes the display 110, the drum thermistor 26, the control unit 400, and a storage unit 410. The control unit 400 (e.g., processor and memory) includes a temperature acquisition unit 401 (e.g., a temperature sensor), a development control unit 402 (e.g., a development control manager, a development control module), a development acceptance unit 403 (e.g., a development acceptance manager, a development acceptance module), a color acceptance unit 404, and a mode setting unit 405.

The control unit 400 is realized by a processor such as a central processing unit (CPU). The control unit 400 functions as the temperature acquisition unit 401, the development control unit 402, the development acceptance unit 403, the color acceptance unit 404, and the mode setting unit 405 by executing programs by the processor. The storage unit 410 is realized by a memory device such as a magnetic hard disk device or a semiconductor memory device. The storage unit 410 stores various threshold values and setting values.

In some embodiments, the image forming apparatus 100 includes a plurality of developing devices 24 (24*a* to 24*d*). A plurality of developing devices 24*a* to 24*d* are provided corresponding to a plurality of colors.

The temperature acquisition unit 401 acquires the temperature of at least a specific developing device 24 among the plurality of developing devices 24. The specific developing device 24 is the developing device 24 that tends to reach the highest temperature, and in some embodiments, it is the K-color developing device 24*d*. That is, in some embodiments, the specific color is K color. It is also possible to regard the temperature of the other developing devices 24*a* to 24*c* as the temperature of the K-color developing device 24*d*. In this case, the temperature acquisition unit 401 may acquire the temperature of any one of the other developing devices 24*a* to 24*c*.

In the image forming apparatus 100, the K-color developing device 24*d* and the photoconductor drum 21 are included in the same image forming unit 20*d*, and are close to each other. Therefore, it can be regarded that the temperature of the K-color developing device 24*d* and the temperature of the surface of the photoconductor drum 21 are approximately the same. Therefore, the temperature acquisition unit 401 acquires the temperature detected by the drum thermistor 26 as the temperature of the K-color developing device 24*d*.

Note that the image forming apparatus 100 may also be provided with a dedicated temperature detection unit for detecting the temperature of the K-color developing device 24*d*. In this case, the temperature acquisition unit 401 may acquire the temperature of the K-color developing device 24*d* based on the detection result of the temperature detection unit.

The development control unit 402 stops development by the K-color developing device 24*d* based on the temperature of the K-color developing device 24*d* acquired by the temperature acquisition unit 401. For example, the development control unit 402 stops development if the temperature of the K-color developing device 24*d* reaches or exceeds the stop temperature (threshold value stored in the storage unit 410). This stop is a stop in intermittent printing. Hereinafter, this stop will be referred to as "K-color development stop."

Further, the development control unit 402 causes the other developing devices 24 (24*a*, 24*b*, 24*c*) other than the K-color developing device 24*d* to perform development while the K-color development is stopped.

Development by another developing device 24 is performed, for example, according to selection of the user. This will be described in detail. The development acceptance unit 403 accepts whether or not to perform development by another developing device 24 while the K-color development is stopped.

The development control unit 402 causes another developing device 24 to perform development according to the result accepted by the development acceptance unit 403.

Here, using FIG. 5, an example of a screen if the development acceptance unit 403 accepts whether or not to perform development by another developing device 24 will be described.

Figure 5:
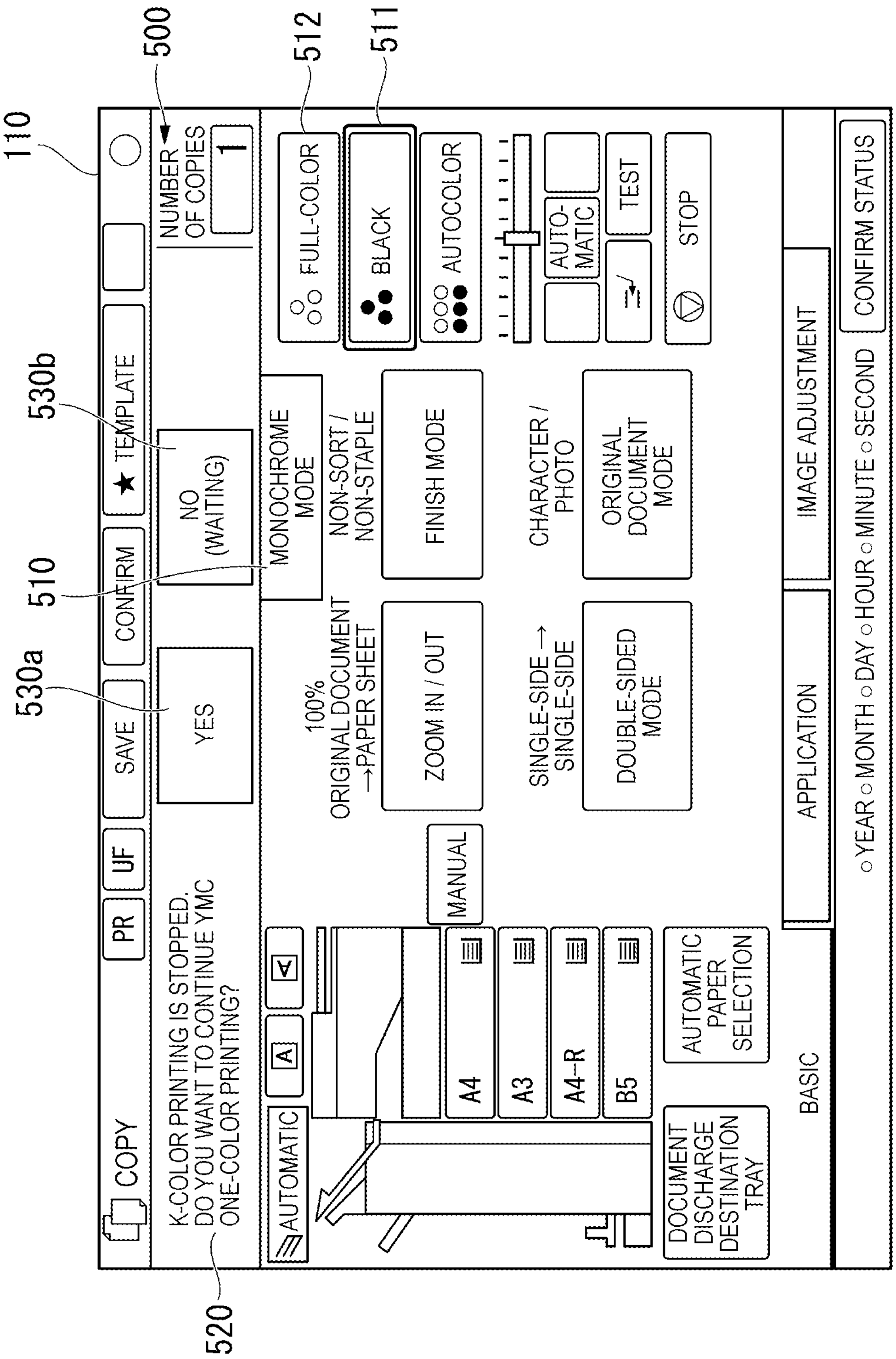
FIG. 5 is a user interface including a confirmation screen when accepting whether or not to perform development by another developing device, according to some embodiments.

FIG. 5 is a view illustrating an example of a confirmation screen when accepting whether or not to perform development by another developing device 24. As illustrated in FIG. 5, a confirmation screen 500 is displayed on the display 110. The confirmation screen 500 includes mode information 510, notification information 520, and selection buttons 530 (530*a*, 530*b*).

The mode information 510 indicates the current print mode. The print mode includes a monochrome mode and a multicolor mode (full-color mode). In the illustration, the mode information 510 indicates that the current mode is a monochrome mode. In addition, in the drawing, the monochrome button 511 is selected, indicating that the current mode is the K monochrome mode. Note that the multicolor mode is a mode set by selecting a full color button 512. If the full-color mode is selected, the mode information 510 displays, for example, the characters "full-color mode" indicating the multicolor mode.

The notification information 520 is a notification indicating that printing of K color is stopped and whether or not printing is to be performed with multi colors (Y color, M color, C color) instead of K color.

The selection buttons 530 include a multicolor selection button 530*a* indicating printing in multicolor and a wait selection button 530*b* indicating not printing in multicolor.

If the user selects the multicolor selection button 530*a*, the development control unit 402 can cause another developing device 24 to perform development. On the other hand, if the user selects the wait selection button 530*b*, the development control unit 402 causes the other developing device 24 to continue the K-color development being stopped without performing development.

The development control unit 402 causes one developing device 24 (developing devices 24*a*, 24*b*, and 24*c*) other than the K-color developing device 24*d* to perform development while the K-color development is stopped. One developing device 24 is determined, for example, by user selection. This will be described in detail.

The color acceptance unit 404 accepts selection of one color among developable colors while the K-color development is stopped. Developable colors are, for example, any one of Y color, M color, and C color.

The development control unit 402 causes the developing device 24 capable of developing the one color accepted by the color acceptance unit 404 to perform development.

Here, using FIG. 6, a screen example if the color acceptance unit 404 accepts one color will be described.

Figure 6:
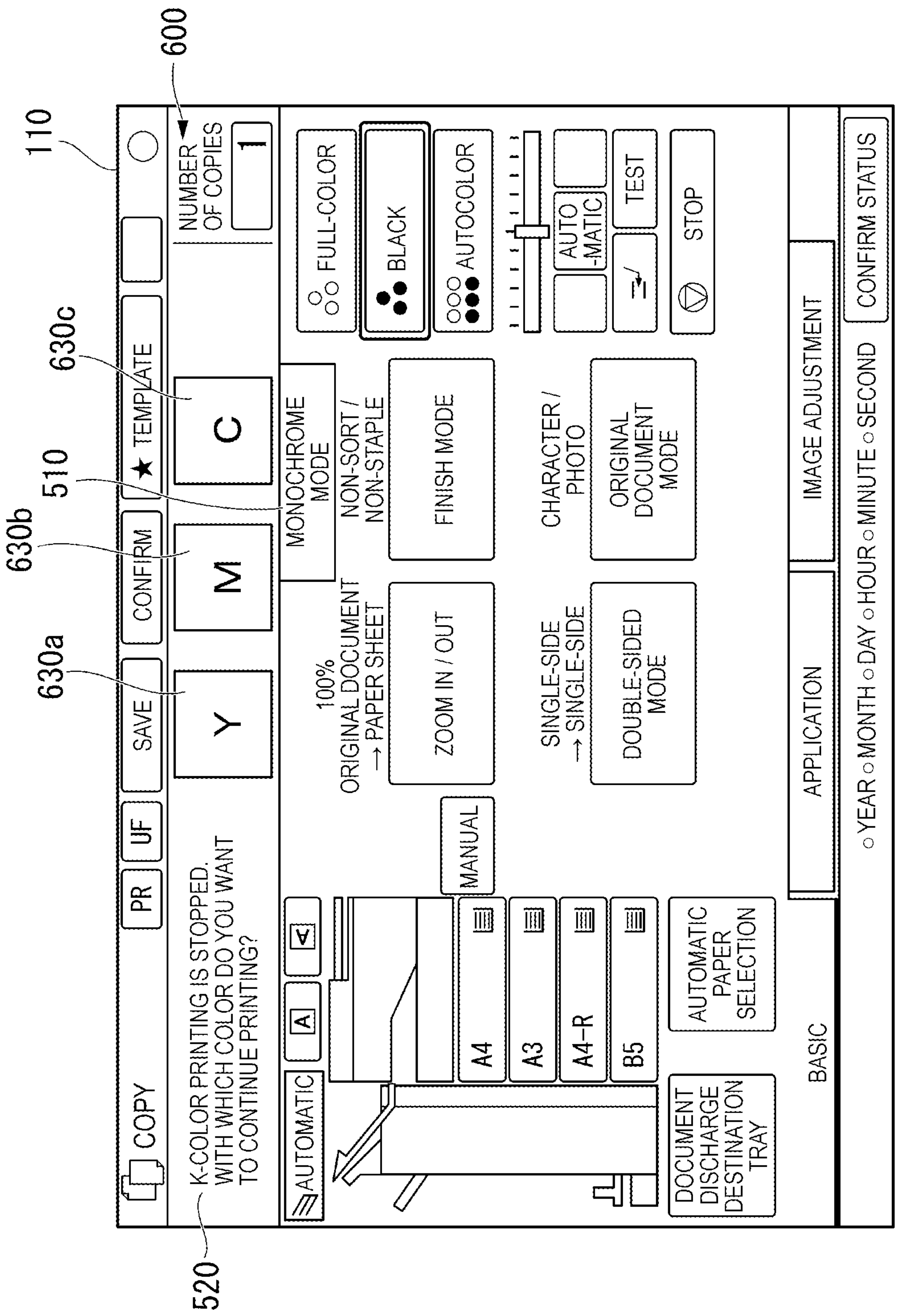
FIG. 6 is a user interface including a color selection screen when accepting selection of one color, according to some embodiments.

FIG. 6 is a view illustrating an example of the color selection screen when accepting selection of one color. A color selection screen 600 illustrated in FIG. 6 includes color selection buttons 630 (630*a*, 630*b*, 630*c*).

The color selection buttons 630 include a Y-color selection button 630*a* for indicating printing in Y color, an M-color selection button 630*b* for indicating printing in M color, and a C-color selection button 630*c* for indicating printing in C color.

The development control unit 402 causes one developing device 24 of the color corresponding to the color selection button 630 selected by the user to perform development. For example, if the user selects the C-color selection button 630*c*, the development control unit 402 causes the C-color developing device 24*c* to perform development.

Figure 7:
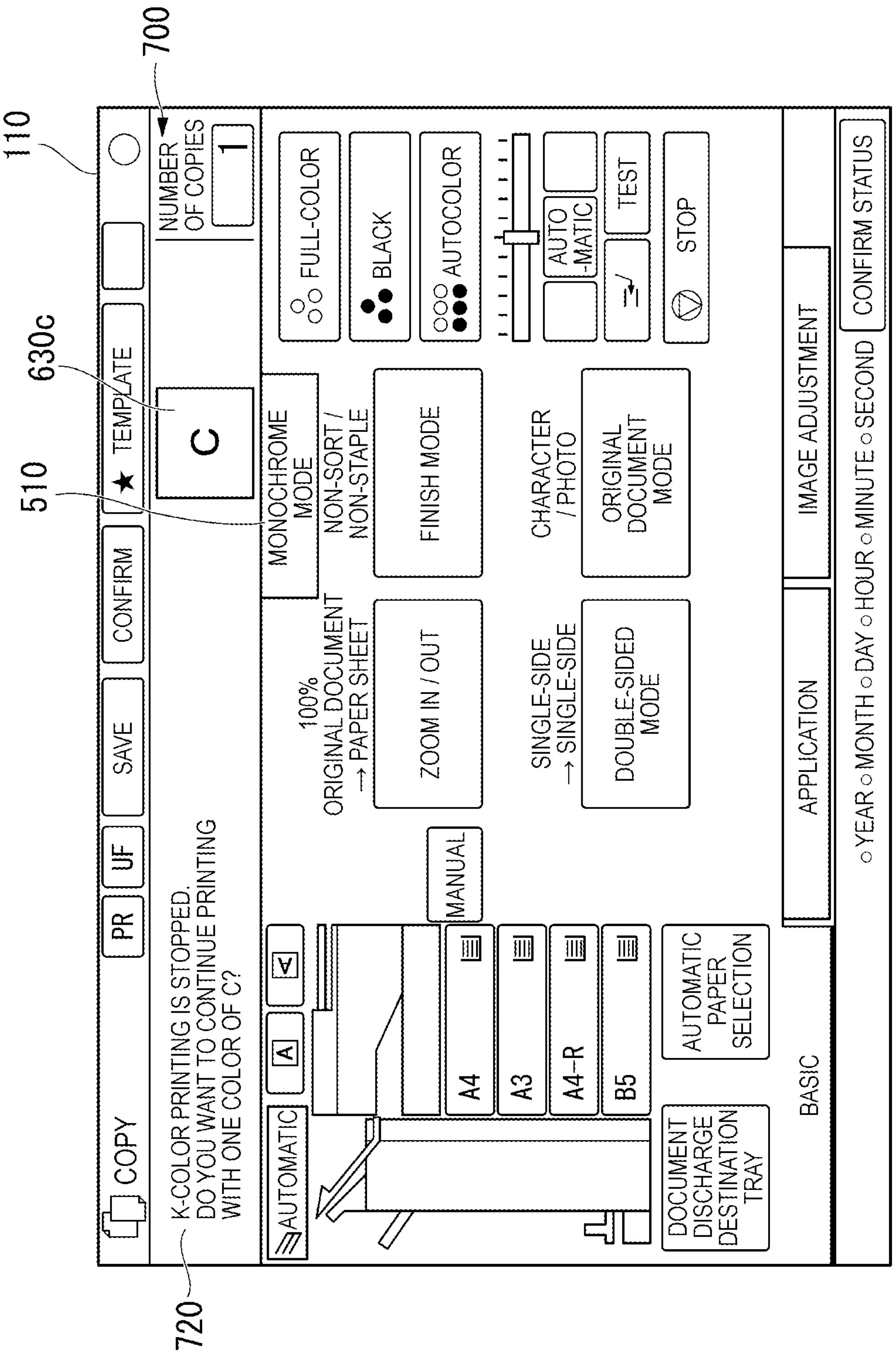
FIG. 7 is a user interface including a screen that transitions if a C-color selection button 630*c* is selected on a color selection screen 600, according to some embodiments.

FIG. 7 is a view illustrating an example of a screen that transitions if the C-color selection button 630*c* is selected on the color selection screen 600. A print continuation screen 700 illustrated in FIG. 7 includes notification information 720.

The notification information 720 is a notification indicating that the K-color printing is being stopped and that the C-color printing will continue instead of the K-color.

Further, the development control unit 402 can restart the development by the K-color developing device 24*d* after stopping the K-color development. For example, the development control unit 402 restarts development by the K-color developing device 24*d* based on the temperature of the K-color developing device 24*d* after stopping the K-color development. For example, if the temperature of the K-color developing device 24*d* becomes equal to or lower than the restartable temperature (threshold value stored in the storage unit 410), the K-color development is restarted. The restartable temperature is, for example, a temperature lower than the stop temperature. Further, if the temperature of the K-color developing device 24*d* becomes equal to or higher than the stop temperature again after the restart, the development control unit 402 may stop the development by the K-color developing device 24*d*.

Next, the print mode will be described in detail. The mode setting unit 405 sets one of the first mode and the second mode. The first mode is a monochrome mode in which a monochromatic finished image (monochrome development) is generated by one developing device 24. The second mode is a multicolor mode (full-color mode) in which a finished image in a plurality of colors (multi-color development) is generated by the plurality of developing devices 24. In the multicolor mode, development is performed by all the developing devices 24 for y-color, m-color, c-color, and k-color (YMCK) colors. The monochrome mode or the multicolor mode is set according to the operation of the user.

If the monochrome mode is set by the mode setting unit 405, the development control unit 402 enables development by one developing device 24 among the other developing devices 24 (24*a*, 24*b*, 24*c*) while the K-color development is stopped. On the other hand, if the multicolor mode is set by the mode setting unit 405, the development control unit 402 cannot use the K-color developing device 24*d* while the K-color development is stopped, and thus the development control unit 402 prevents the other developing devices (24*a*, 24*b*, 24*c*) from performing development. That is, if the multicolor mode is set, the development control unit 402 continues the K-color development being stopped.

Next, using FIGS. 8 and 9, the image forming processing performed by the image forming apparatus 100 according to some embodiments will be described.

Figure 8:
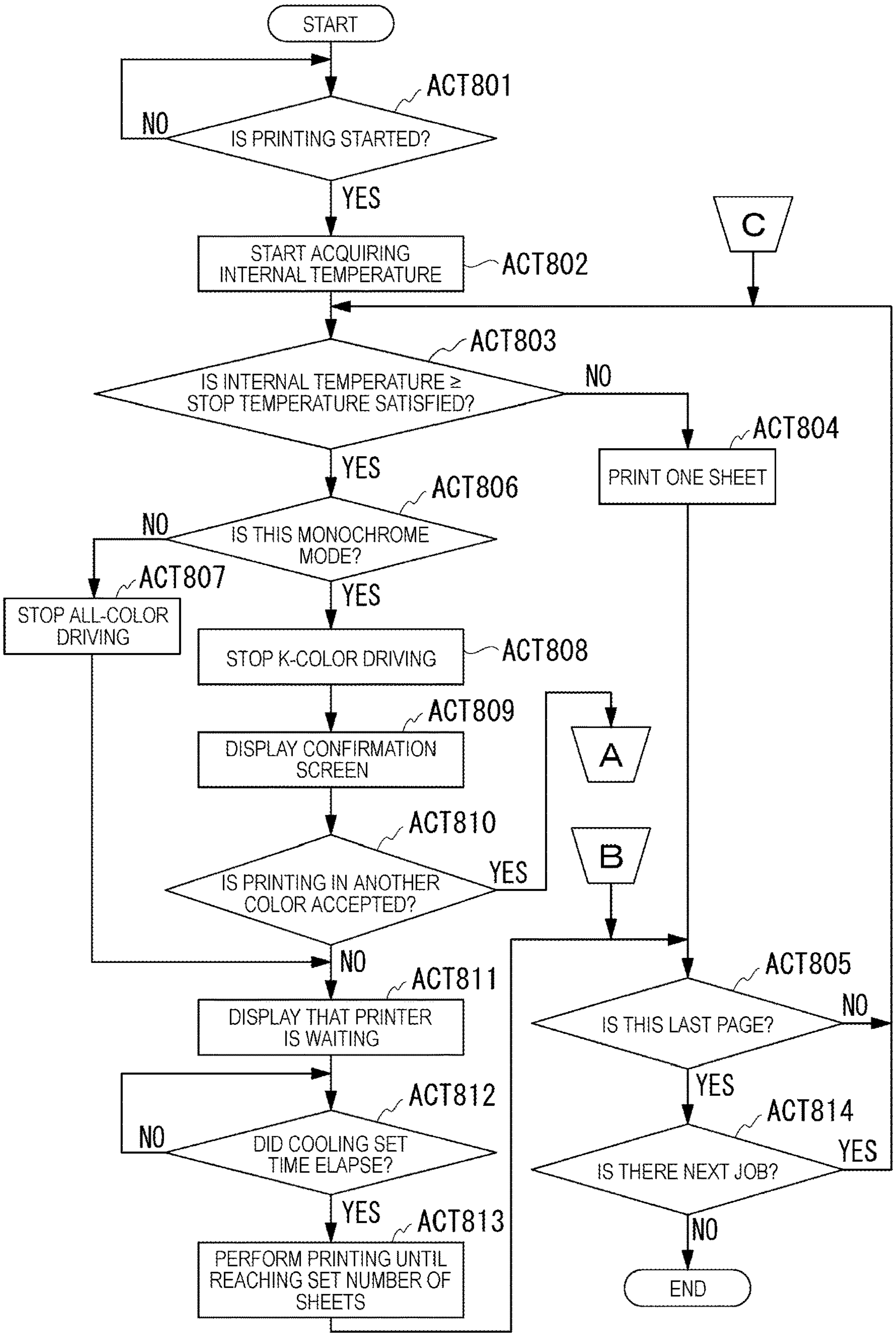
FIG. 8 is a flow diagram of image forming processing performed by the image forming apparatus of FIG. 1, according to some embodiments.
Figure 9:
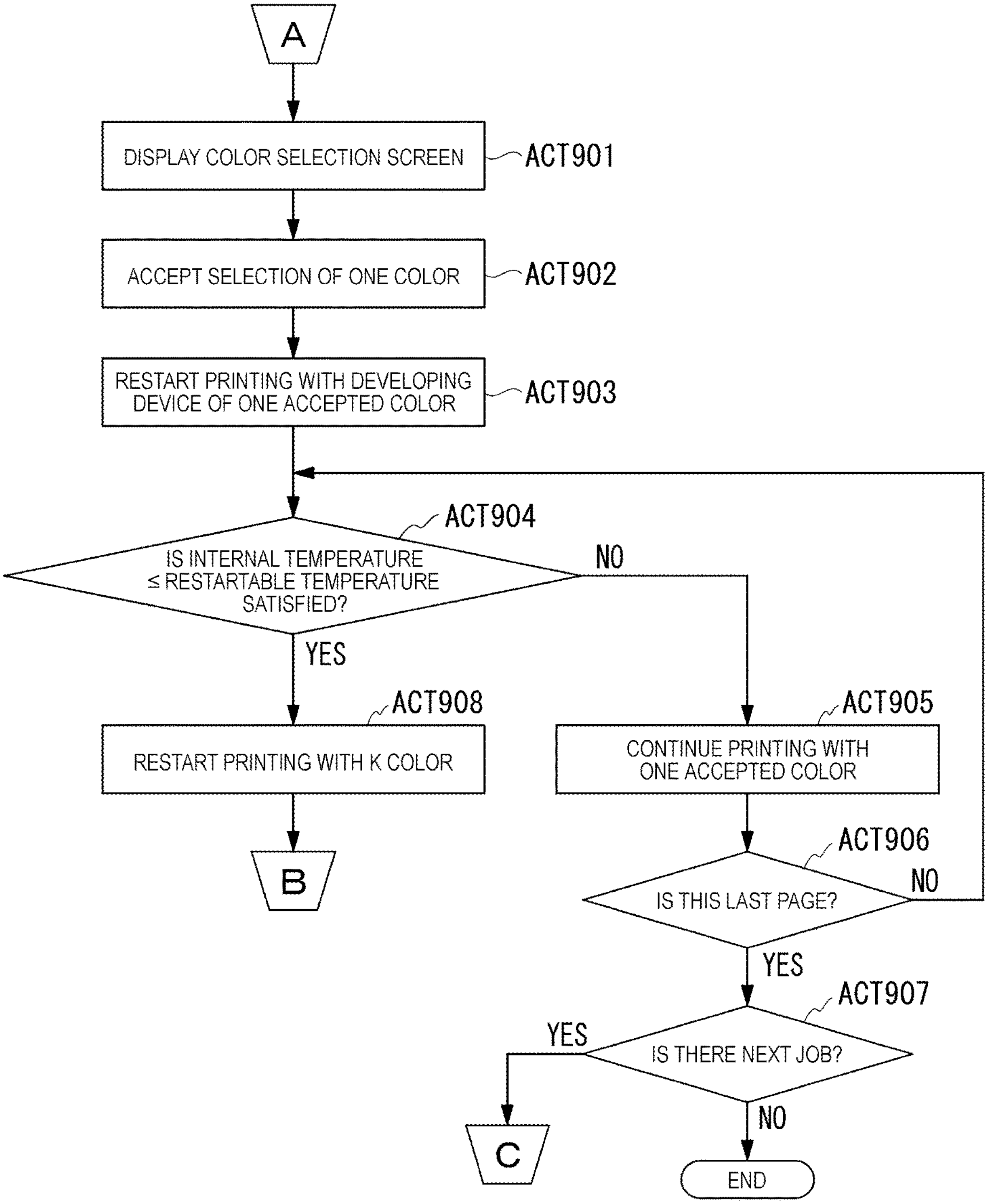
FIG. 9 is a flow diagram of image forming processing, according to some embodiments.

FIGS. 8 and 9 are flow charts (e.g., flow diagrams) illustrating an example of the image forming processing performed by the image forming apparatus 100 according to some embodiments. As illustrated in FIG. 8, the control unit 400 waits until printing starts (ACT801: NO). If printing starts (ACT801: YES), the control unit 400 starts acquiring the internal temperature (the temperature of the developing device 24) from the drum thermistor 26 (ACT802).

Next, the control unit 400 determines whether or not the internal temperature is equal to or higher than the stop temperature (ACT803). If the control unit 400 determines that the internal temperature is not equal to or higher than the stop temperature (ACT803: NO), the control unit prints one sheet (ACT804). Then, the control unit 400 determines whether or not this is the last page (ACT805). If this is not the last page (ACT805: NO), the control unit 400 returns to ACT803 and repeats the processing of ACT803 to ACT805.

On the other hand, in ACT803, if the control unit 400 determines that the internal temperature is equal to or higher than the stop temperature (ACT803: YES), it is determined whether or not the current print mode is the monochrome mode (ACT806). If the current print mode is not the monochrome mode (ACT806: NO), that is, if the current mode is the multicolor mode, the control unit 400 stops driving the developing devices 24 of all colors (ACT807), proceeds to ACT811, and displays that the printer is waiting for intermittent printing.

On the other hand, if the current print mode is the monochrome mode (ACT806: YES), the control unit 400 stops driving the K-color developing device 24*d* (ACT808), and displays the confirmation screen 500 (FIG. 5) (ACT809). Then, the control unit 400 determines whether or not printing in multicolor was accepted by selecting the multicolor selection button 530*a* on the confirmation screen 500 (ACT810).

If printing in multicolor is not accepted (ACT810: NO), the control unit 400 displays on the display 110 that the printer is waiting for intermittent printing by pressing the wait selection button 530*b* (ACT811). Then, the control unit 400 determines whether or not the preset cooling set time elapsed (ACT812).

The cooling set time is an estimated time representing a duration of time until the internal temperature reaches a temperature at which the operation can be restarted (restartable temperature). The relationship between the passage of time and the decrease in internal temperature is empirically known. Therefore, the time (cooling set time) until the restartable temperature is reached can be set in advance and is stored in the storage unit 410. Note that the processing of ACT812 is not limited to the processing of determining whether or not the cooling set time elapsed, and may be processing of determining whether or not the internal temperature became equal to or lower than the restartable temperature. In some embodiments, the restartable temperature may be a threshold value of a control variable corresponding to a sensor value. For example, the restartable temperature may be a predetermined threshold value. For example, the restartable temperature may be a threshold value for a control variable corresponding to one or more time varying values of one or more sensors configured to measure and/or detect a temperature. For example, the restartable temperature may be a lower threshold value and the stop temperature may be an upper threshold value. For example, the control unit may obtain one or more threshold values and compare one or more sensor values to the one or more threshold values and perform an action based on the comparison. For example, the action may be starting, stopping, resuming, pausing, and/or continuing printing based on the comparison of the sensor value(s) to the restartable temperature and/or the stop temperature.

The control unit 400 waits until the cooling set time elapses (ACT812: NO), and if the cooling set time elapses (ACT812: YES), the predetermined set number of sheets is printed (ACT813). The set number of sheets is such that the internal temperature (e.g., one or more time varying values of one or more sensors configured to measure at least a temperature) does not exceed the stop temperature (e.g., an upper threshold value) after the operation is restarted, and is stored in the storage unit 410 in advance. Then, the control unit 400 proceeds to ACT805, and if this is not the last page (ACT805: NO), returns to ACT803, and repeats the processing of ACT803 to ACT813.

On the other hand, if this is the last page in ACT805 (ACT805: YES), the control unit 400 determines whether or not there is a next job (ACT814). If there is a next job (ACT814: YES), the control unit 400 returns to ACT803 and repeats the processing of ACT803 to ACT814. On the other hand, if there is no next job (ACT814: NO), the control unit 400 terminates the series of processing.

In ACT810, if printing in multicolor is accepted (ACT810: YES), as illustrated in FIG. 9, the control unit 400 displays the color selection screen 600 (FIG. 6) (ACT901) and accepts selection of one color (ACT902). Then, the control unit 400 restarts printing by causing the developing device 24 of the one accepted color to perform development (ACT903).

Next, the control unit 400 determines whether or not the internal temperature became equal to or lower than the restartable temperature (ACT904). If the internal temperature does not become equal to or lower than the restartable temperature (ACT904: NO), the control unit 400 continues printing with the one color accepted in ACT902 (ACT905). Next, the control unit 400 determines whether or not this is the last page (ACT906). If this is not the last page (ACT906: NO), the control unit 400 returns to ACT904 and repeats the processing of ACT904 to ACT906.

On the other hand, if this is the last page (ACT906: YES), the control unit 400 determines whether or not there is a next job (ACT907). If there is a next job (ACT907: YES), the control unit 400 returns to ACT803. On the other hand, if there is no next job (ACT907: NO), the control unit 400 terminates the series of processing.

In ACT904, if the internal temperature becomes equal to or lower than the restartable temperature (ACT904: YES), the control unit 400 causes the K-color developing device 24*d* to perform development, that is, restarts printing in K color (ACT908). After processing of ACT908, the control unit 400 proceeds to ACT805.

In addition, in ACT902, since the selection of one color is accepted by the user, even if the internal temperature becomes equal to or lower than the restartable temperature (ACT904: NO), instead of restarting printing in K color, printing in one color as it is may be continued. In other words, ACT904 and ACT908 may not be processed.

As described above, the image forming apparatus 100 of the embodiment stops the development by the K-color developing device 24*d* based on the temperature of the K-color developing device 24*d*, and while the K-color development is stopped, the other developing device 24 is caused to perform development. As a result, if it is improbable or impossible to perform printing in K color, it is possible to perform printing in another color. Therefore, printing can be completed quickly. Therefore, the image forming apparatus 100 improves convenience of the user.

Further, the image forming apparatus 100 according to some embodiments causes one developing device 24 among the other developing devices 24 (24*a*, 24*b*, 24*c*) to perform development while the K-color development is stopped. As a result, only one developing device 24 (one image forming unit 20) can be operated, and thus cooling efficiency can be improved compared to the case where the plurality of developing devices 24 are operated. In addition, since one developing device 24 is used for monochrome printing, printing can be performed with simple control.

Further, the image forming apparatus 100 according to some embodiments accepts whether or not to perform development by the other developing devices 24 (24*a*, 24*b*, 24*c*) while the K-color development is stopped, and depending on the result of acceptance, another developing device 24 is caused to perform development. As a result, if the user desires, printing can be performed using another developing device 24. In other words, if the user does not desire to perform printing using another developing device 24, intermittent printing can be performed to perform printing in K color as desired by the user. Therefore, since it is possible to perform optimum printing according to the selection of the user, it is possible to further improve convenience.

Further, the image forming apparatus 100 according to some embodiments accepts the selection of one of the developable colors while the K-color development is stopped, and causes the developing device 24 capable of developing one accepted color to perform development. As a result, it is possible to perform printing in the colors desired by the user.

Further, the image forming apparatus 100 according to some embodiments restarts development by the K-color developing device 24*d* based on the temperature of the K-color developing device 24*d* while the K-color development is stopped. Accordingly, it is possible to reduce the number of sheets to be printed in other colors, that is, to perform printing in the color initially designated by the user as much as possible.

Further, in the monochrome mode, the image forming apparatus 100 according to some embodiments enables development by one developing device 24 among the other developing devices 24 (24*a*, 24*b*, 24*c*) while the K-color development is stopped, and in the multicolor mode, the image forming apparatus 100 prevents other developing devices 24 from performing development while K-color development is stopped. Accordingly, in the monochrome mode, rapid printing can be performed. Further, in the other color mode, since the multicolor mode is selected, the user desires to give priority to quality, and thus high quality printing can be performed.

In addition, the image forming apparatus 100 according to some embodiments acquires the temperature of the K-color developing device 24*d* based on the detection result of the drum thermistor 26 that detects the temperature of the photoconductor drum 21. As a result, the detection result of the drum thermistor 26 can be used without providing a dedicated temperature detection unit in the developing device 24, and thus the number of parts for the temperature detection unit can be reduced.

Further, the drum thermistor 26 according to some embodiments is disposed in contact with the photoconductor drum 21 at a position downstream of the position of the developing device 24 in the moving direction of the photoconductor drum 21. Thereby, the temperature of the photoconductor drum 21 and the temperature of the developing device 24 can be detected with high accuracy.

Next, each modification example of some embodiments will be described. In addition, in each of the modification examples below, the description of the contents described in the above-described embodiment will be omitted as appropriate. Moreover, it is also possible to combine the above-described embodiment with each of the following modification examples.

Next, Modification Example 1 of the embodiment will be described. In the above-described embodiment, the example in which one developing device 24 among the other developing devices 24 (24*a*, 24*b*, 24*c*) is caused to perform development while the K-color development is stopped was described. In Modification Example 1, an example will be described in which the plurality of developing devices 24 capable of generating K color among the other developing devices 24*a*, 24*b*, and 24*c* perform development while K-color development is stopped.

In Modification Example 1, the development control unit 402 causes all of the plurality of developing devices 24*a*, 24*b*, and 24*c* capable of generating K color among the other developing devices 24*a*, 24*b*, and 24*c* other than the K-color developing device 24*d* to perform development while the K-color development is stopped. In addition, in Modification Example 1, even if the K-color development is stopped, the developing devices 24*a*, 24*b*, and 24*c* can perform printing in the K color initially designated by the user, and thus various screens (confirmation screen 500 in FIG. 5, the color selection screen 600 in FIG. 6, and the like) are not displayed.

Next, image forming processing performed by the image forming apparatus 100 according to Modification Example 1 will be described.

Figure 10:
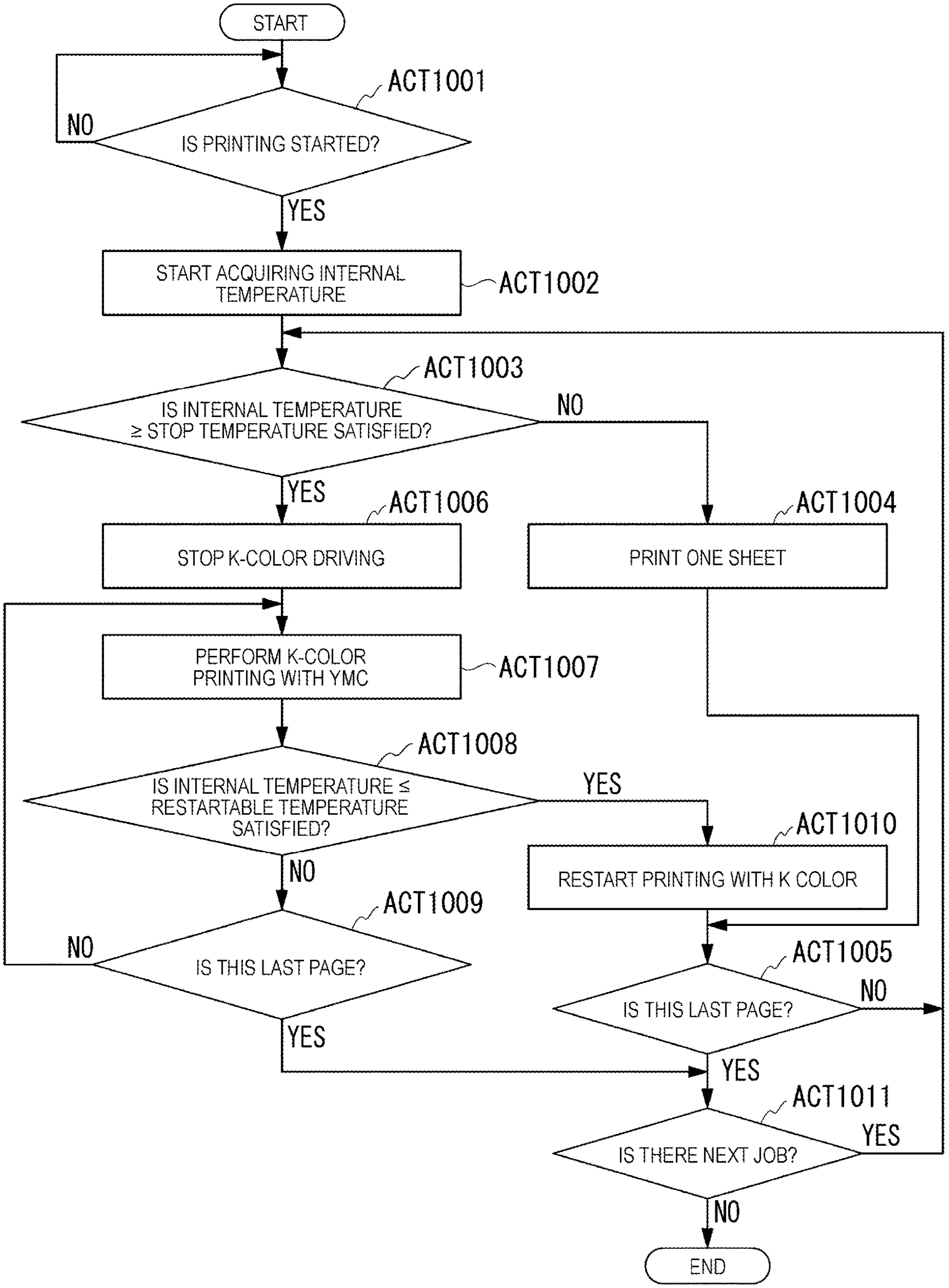
FIG. 10 is a flow diagram of image forming processing performed by the image forming apparatus of FIG. 1, according to some embodiments.

FIG. 10 is a flow chart illustrating an example of image forming processing performed by the image forming apparatus 100 according to Modification Example 1. In addition, in FIG. 10, monochrome mode includes the generation of monochromatic finished images by one developing device 24 as well as the generation of monochromatic finished images by the plurality of developing devices 24. In FIG. 10, description will be given assuming that the monochrome mode is set.

As illustrated in FIG. 10, the control unit 400 waits until printing starts (ACT1001: NO). If printing starts (ACT1001: YES), the control unit 400 starts acquiring the internal temperature (the temperature of the developing device 24) from the drum thermistor 26 (ACT1002).

Next, the control unit 400 determines whether or not the internal temperature is equal to or higher than the stop temperature (ACT1003). If the control unit 400 determines that the internal temperature is not equal to or higher than the stop temperature (ACT1003: NO), the control unit prints one sheet (ACT1004). Then, the control unit 400 determines whether or not this is the last page (ACT1005). If this is not the last page (ACT1005: NO), the control unit 400 returns to ACT1003 and repeats the processing of ACT1003 to ACT1005.

On the other hand, in ACT1003, if the control unit 400 determines that the internal temperature is equal to or higher than the stop temperature (ACT1003: YES), the control unit 400 stops driving the K-color developing device 24*d* (ACT1006). Then, the control unit 400 causes the Y-color developing device 24*a*, the M-color developing device 24*b*, and the C-color developing device 24*c* to perform development, and performs printing in the K color generated by the Y, M, and C colors (ACT1007).

Next, the control unit 400 determines whether or not the internal temperature became equal to or lower than the restartable temperature (ACT1008). If the internal temperature does not become equal to or lower than the restartable temperature (ACT1008: NO), the control unit 400 determines whether or not this is the last page (ACT1009). If this is not the last page (ACT1009: NO), the control unit 400 returns to ACT1007 and repeats the processing of ACT1007 to ACT1009.

On the other hand, if this is the last page (ACT1009: YES), the control unit 400 proceeds to ACT1011. In ACT1008, if the internal temperature becomes equal to or lower than the restartable temperature (ACT1008: YES), the control unit 400 causes the K-color developing device 24*d* to restart printing in K color (ACT1010).

If this is the last page in ACT1005 (ACT1005: YES), the control unit 400 determines whether or not there is a next job (ACT1011). If there is a next job (ACT1011: YES), the control unit 400 returns to ACT1003. On the other hand, if there is no next job (ACT1011: NO), the control unit 400 terminates the series of processing.

As described above, the image forming apparatus 100 according to Modification Example 1 causes the plurality of developing devices 24 capable of generating the K color among the other developing devices 24*a*, 24*b*, and 24*c* to perform development while the K-color development is stopped. As a result, even if the K-color development is stopped, it is possible to perform printing in K color using another developing device 24. Further, according to Modification Example 1, without displaying various screens (for example, the confirmation screen 500 in FIG. 5) or accepting various operations (for example, operation of the selection button 530 in FIG. 5), that is, without performing control related to display of various screens or control for accepting various selections, printing in K color can be performed with simple control.

Next, Modification Example 2 will be described. In the above-described embodiment, the example of the drum thermistor 26 that comes into contact with the photoconductor drum 21 was described. In Modification Example 2, an example of a thermistor that does not come into contact with the photoconductor drum 21 will be described.

Figure 11:
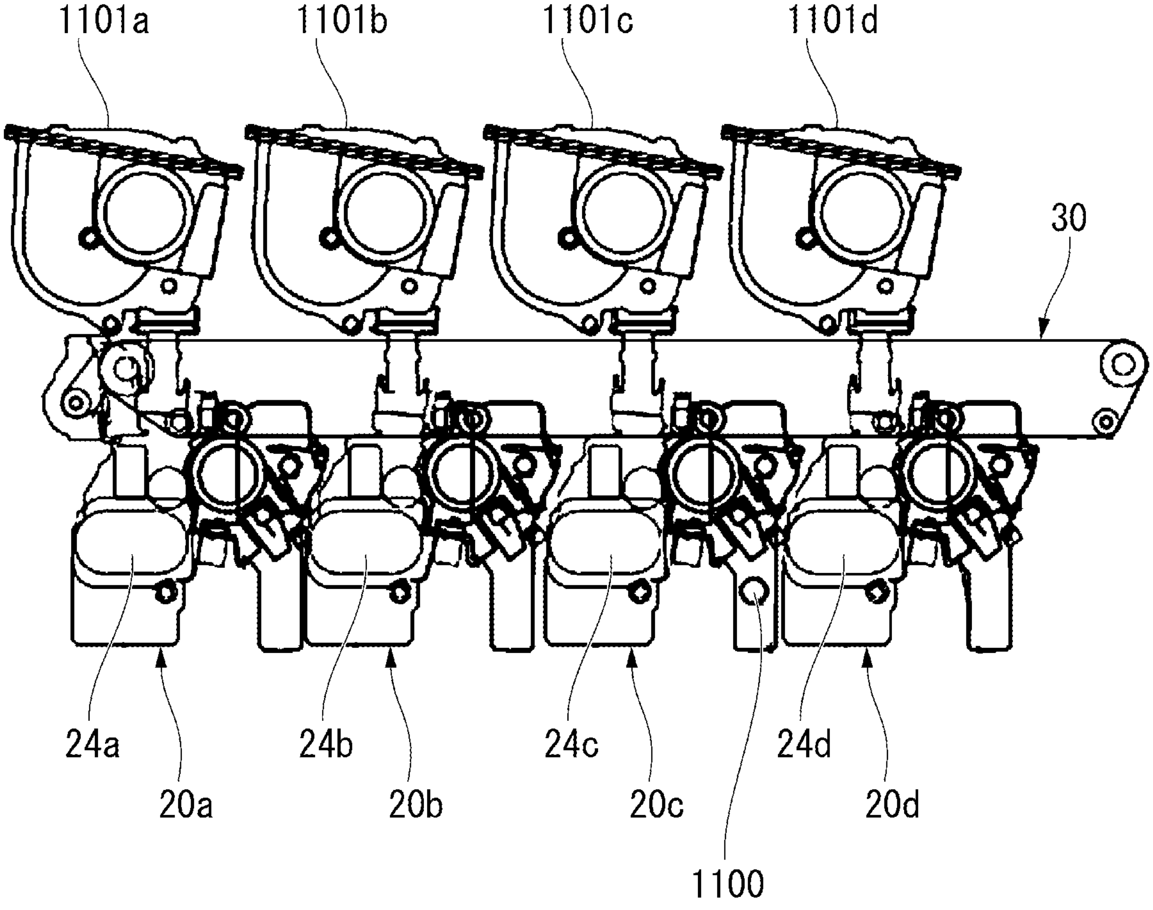
FIG. 11 is a view illustrating the internal configuration of the image forming apparatus of FIG. 1, including the image forming unit, according to some embodiments.

FIG. 11 is a view illustrating the internal configuration of the image forming apparatus 100 including the image forming unit 20 according to Modification Example 2.

Figure 12:
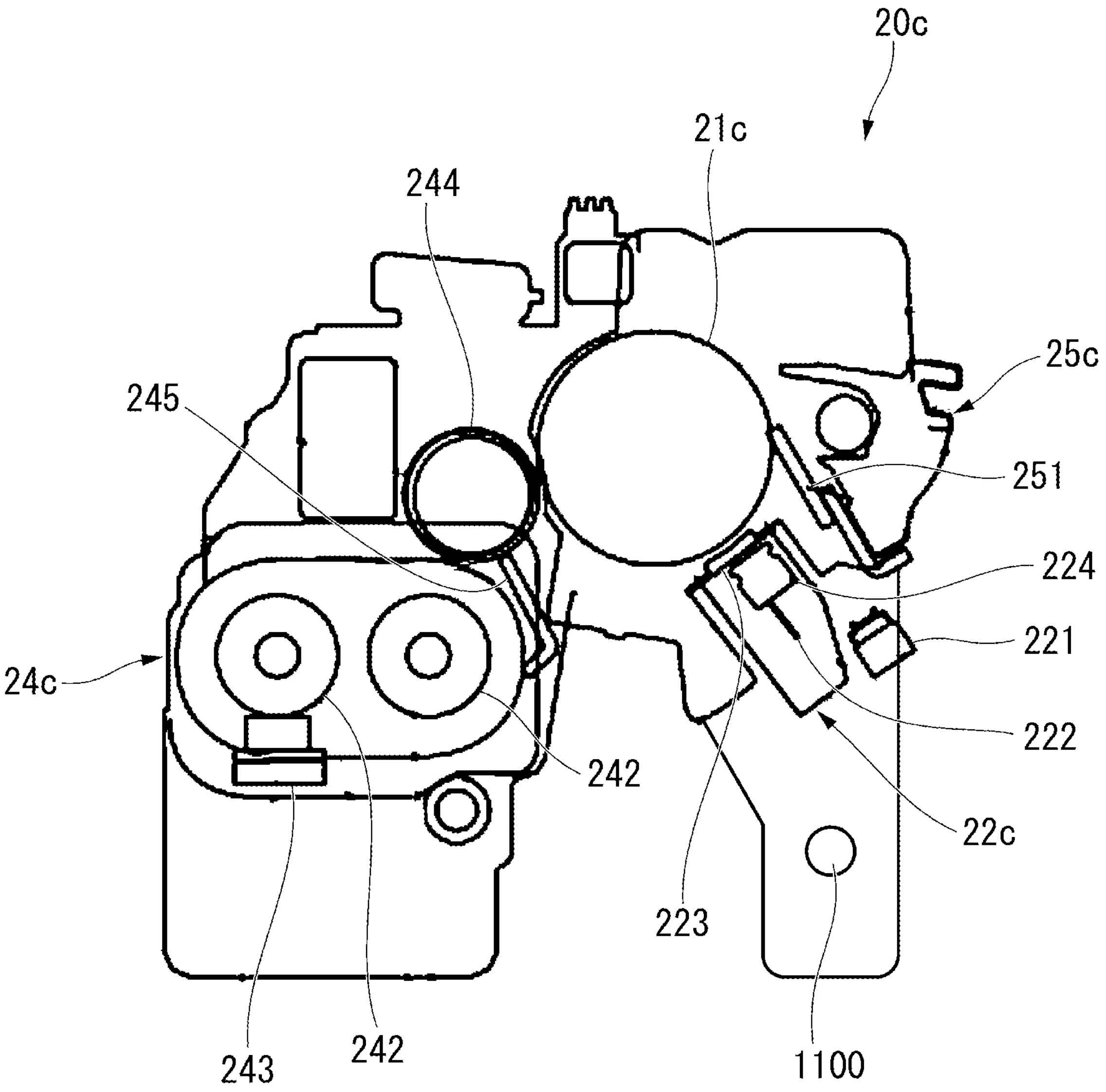
FIG. 12 is a view illustrating the image forming unit of FIG. 2, according to some embodiments.

FIG. 12 is a view illustrating an example of the image forming unit 20 according to Modification Example 2. Toner cartridges 1101 (1101*a* to 1101*d*) illustrated in FIG. 11 are cartridges containing toner corresponding to YMCK. As illustrated in FIGS. 11 and 12, a thermistor 1100 is provided in the C-color image forming unit 20*c*. The thermistor 1100 is disposed apart from the photoconductor drum 21*c*. Although the thermistor 1100 is provided in the C-color image forming unit 20*c*, the thermistor 1100 is disposed at a position close to the K-color developing device 24*d*.

The thermistor 1100 detects the ambient temperature of the photoconductor drum 21. The temperature acquisition unit 401 according to Modification Example 2 acquires the temperature detected by the thermistor 1100 as the temperature of the K-color developing device 24*d*. Even with such a configuration, the development control unit 402 stops development by the K-color developing device 24*d* based on the temperature of the K-color developing device 24*d* acquired by the temperature acquisition unit 401, and causes the other developing devices 24 (24*a*, 24*b*, 24*c*) other than the K-color developing device 24*d* to perform development while K-color development is stopped. Note that the thermistor 1100 is not limited to being provided only in the image forming unit 20*c*, and may be provided in each of the other image forming units 20*a*, 20*b*, and 20*d*.

As described above, the thermistor 1100 according to Modification Example 2 is disposed apart from the photoconductor drum 21 and detects the ambient temperature of the photoconductor drum 21. By detecting the ambient temperature of the photoconductor drum 21 in this manner, the temperature of the photoconductor drum 21 and the developing device 24 can be detected. In addition, since the thermistor 1100 is of a non-contact type, the degree of freedom regarding the placement of the thermistor 1100 can be improved.

In particular, in Modification Example 2, the thermistor 1100 is provided only in the image forming unit 20*c*. Therefore, the number of parts of the thermistor 1100 can be reduced. Accordingly, by using the thermistor 1100 according to Modification Example 2, the size of the image forming apparatus 100 can be reduced. In addition, the thermistor 1100 is suitable for a small image forming apparatus 100.

Next, Modification Example 3 will be described. In the above-described embodiment, an example was described in which selection of one of Y, M, and C colors is accepted while K-color development is stopped (FIG. 6). In Modification Example 3, an example will be described in which selection of a color other than Y, M, and C colors is accepted while K-color development is stopped.

Figure 13:
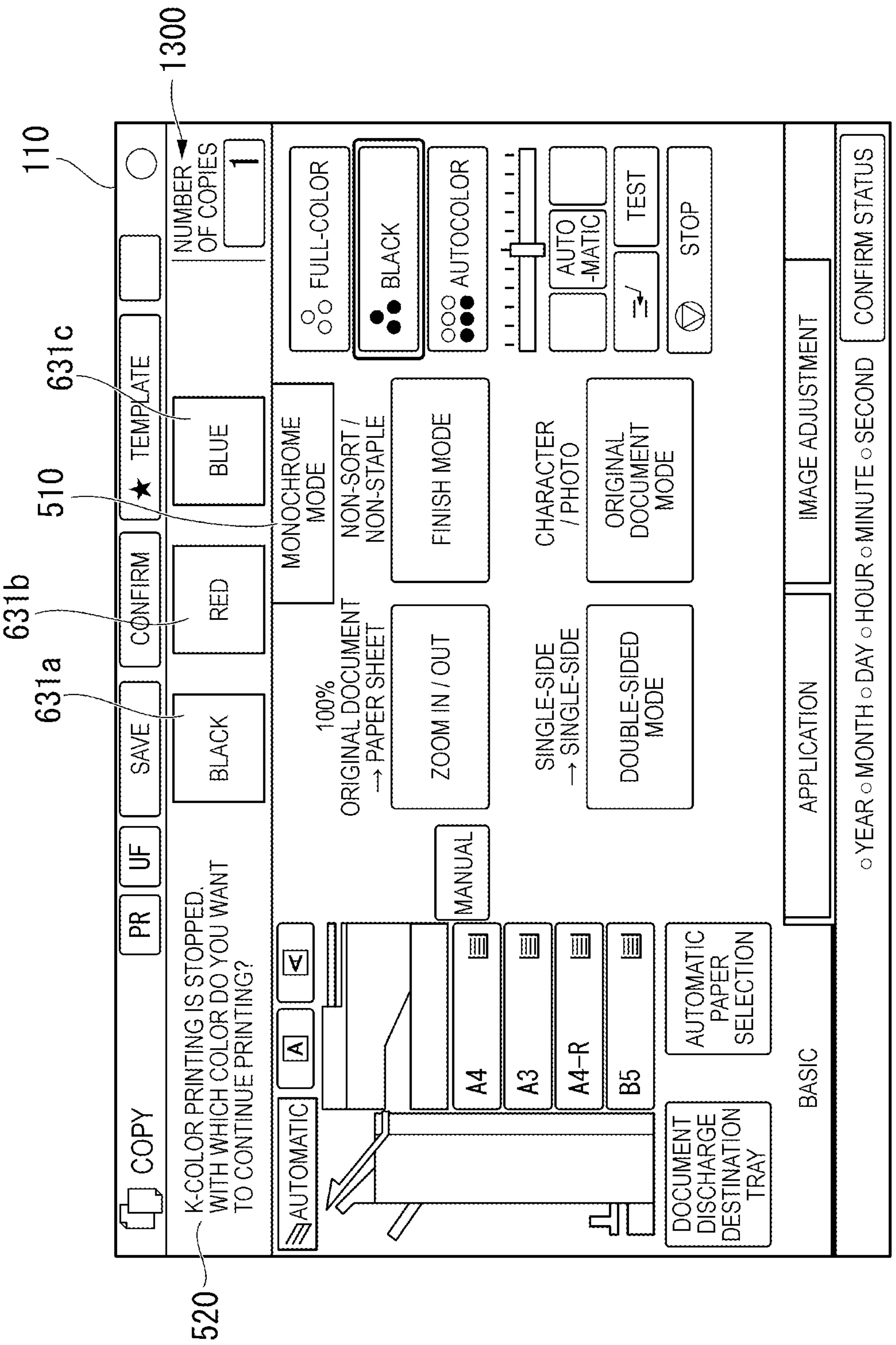
FIG. 13 is a user interface including a color selection screen, according to some embodiments.

FIG. 13 is a diagram illustrating an example of a color selection screen according to Modification Example 3. A color selection screen 1300 illustrated in FIG. 13 includes color selection buttons 631 (631*a*, 631*b*, 631*c*).

The color selection buttons 631 include, for example, a K-color selection button 631*a* for indicating printing in K color, a red color selection button 631*b* for indicating printing in red color, and a blue color selection button 631*c* for indicating printing in blue color. If each color indicated by the color selection button 631 is a mixture of Y, M, and C colors, that is, if any of these colors is selected, the plurality of developing devices 24*a*, 24*b*, and 24*c* are caused to perform development.

The development control unit 402 causes the plurality of developing devices 24 to perform development according to the color indicated by the color selection button 631 selected by the user.

In addition, in the above example, an example in which K, red, and blue colors are presented to the user was described, but colors other than these may be presented. In addition, the number of colors to be presented is not limited to three, and may be, for example, four or more, or two or less.

According to Modification Example 3, it is possible to increase the number of color variations that the user can select. Therefore, it is possible to further improve the convenience.

Other modification examples of some embodiments are listed below.

In the above-described embodiment, the specific color is the K color, but it is not limited to this. For example, the specific color may be Y color, M color, or C color. In other words, the specific developing device 24 according to some embodiments may be the Y-color developing device 24*a*, the M-color developing device 24*b*, or the C-color developing device 24*c*.

Further, in the above-described embodiment, the plurality of developing devices 24 are of four types corresponding to the four colors of Y, M, C, and K colors, but the embodiment is not limited to this. For example, the plurality of developing devices 24 may be of two types, the K-color developing device 24*d* and the developing device 24 that performs development with decolorable toner (for example, blue) capable of decoloring colors. The decolorable toner is for example a heat decolorable toner decolored by applying a temperature higher than the fixing temperature.

In this case, the development control unit 402 can cause the developing device 24 to perform development with decolorable toner while the K-color development is stopped. For example, the development control unit 402 can stop development by the K-color developing device 24*d* based on the temperature of the K-color developing device 24*d* acquired by the temperature acquisition unit 401, and can cause the decolorable toner developing device 24 to perform development while the K-color development is stopped.

Similarly, the development control unit 402 can cause the K-color developing device 24*d* to perform development while the development by the decolorable toner developing device 24 is stopped. For example, the development control unit 402 can stop development by the decolorable toner developing device 24 based on the temperature of the decolorable toner developing device 24 acquired by the temperature acquisition unit 401, and can also cause the K-color developing device 24*d* to perform development during the stop.

In addition, the plurality of developing devices 24 may be of three types corresponding to three colors of R color (red), G color (green), and B color (blue), or five or more types corresponding to five or more colors.

Further, in the above-described embodiment, the example of accepting the selection of one of Y, M, and C colors while the K-color development is stopped was described (FIG. 6), but a recommended order may be presented and one color selection may be accepted. For example, among the Y, M, and C colors, the color with the largest remaining amount of toner may be ranked in descending order and presented to the user. In addition, in this case, the reason for recommendation (remaining amount of toner) may also be presented.

Further, the image forming apparatus 100 can also be connected to an external device such as a personal computer. In this case, the image forming apparatus 100 may display a screen similar to the screen displayed on the display 110 on the display of an external device. For example, the image forming apparatus 100 may display a screen similar to the confirmation screen 500 (FIG. 5) or the color selection screen 600 (FIG. 6) on the display of the external device. In addition, in this case, the external device may accept selection of whether or not to perform development by another developing device 24 and selection of color while the K-color development is stopped.

A part of functions of the image forming apparatus 100 in the above-described embodiments may be realized by a computer. In that case, a program for realizing the functions of the image forming apparatus 100 (the temperature acquisition unit 401, the development control unit 402, the development acceptance unit 403, the color acceptance unit 404, and the mode setting unit 405) is stored in a computer-readable recording medium. In addition, the function may be realized by causing a computer system to read and execute the program recorded in the recording medium in which the above-described program is recorded.

In addition, the "computer system" referred to here includes hardware, such as an operating system or peripheral devices. In addition, "computer-readable recording medium" refers to a portable medium, a memory device, or the like. Portable media include universal serial bus (USB) flash memory, solid state drive (SSD), flexible disk, magneto-optical disk, ROM, CD-ROM, and the like. Further, the memory device is a hard disk built in the computer system or the like. Furthermore, the "computer-readable recording medium" dynamically holds a program for a short period of time, such as a communication line for transmitting the program via a communication line. The communication line is a network such as the Internet, a telephone line, or the like. In addition, "computer-readable recording medium" may be a volatile memory inside a computer system that serves as a server or a client. The volatile memory holds a program for a certain period of time. Further, the above-described program may be for realizing a part of the above-described functions. In addition, the above-described program may be realized by combining the above-described functions with a program which is already recorded in the computer system.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image forming apparatus, comprising:

a plurality of developing devices configured to respectively develop electrostatic latent images formed on an image carrier, the plurality of developing devices corresponding to a plurality of colors;

a temperature sensor configured to measure a temperature of a first developing device of the plurality of developing devices that develops at least a first color of the plurality of colors; and a controller comprising a processor and a memory, the controller configured to:

stop development performed by the first developing device based on the measured temperature of the first developing device; and operate a second developing device of the plurality of developing devices to perform development when the first developing device is stopped.

2. The image forming apparatus of claim 1, wherein the controller is configured to operate a third developing device of the plurality of developing devices to perform development when the first developing device is stopped.

3. The image forming apparatus of claim 1, wherein the controller is configured to:

determine whether to operate the second developing device when the first developing device is stopped; and operate the second developing device to perform development based on the determination.

4. The image forming apparatus of claim 1, wherein the controller is configured to:

receive a selection of a second color from a subset of the plurality of colors that are developable when the first developing device is stopped; and operate the second developing device to perform development, the second developing device configured to develop the second color.

5. The image forming apparatus of claim 1, wherein the controller is configured to operate the second developing device and a third developing device of the plurality of developing devices when the first developing device is stopped, wherein the second developing device and the third developing device are configured to develop the first color.

6. The image forming apparatus of claim 1, wherein the controller is configured to:

subsequent to stopping the first developing device, restart development via the first developing device based on a temperature of the first developing device measured subsequent to the first developing device being stopped.

7. The image forming apparatus of claim 1, wherein the controller is configured to:

set any one of a plurality of modes including a first mode in which monochrome development is performed by one developing device of the plurality of developing devices and a second mode in which multi-color development is performed by the plurality of developing devices;

enable development by one of the plurality of developing devices when the first developing device is stopped and when the first mode is set by the controller, and prevent the one developing device from performing development while the first developing device is stopped and when the second mode is set by the controller.

8. The image forming apparatus of claim 1, wherein the controller is configured to:

acquire, via the temperature sensor, a temperature of the first developing device based on a temperature of the image carrier.

9. The image forming apparatus of claim 8, wherein the temperature sensor is in contact with the image carrier at a position downstream of the first developing device in a moving direction of the image carrier.

10. The image forming apparatus of claim 8, wherein the temperature sensor is disposed apart from the image carrier and is configured to detect an ambient temperature of the image carrier.

11. An image forming apparatus, comprising:

an image carrier;

a plurality of developing devices configured to respectively develop electrostatic latent images formed on the image carrier, the plurality of developing devices comprising:

a first developing device configured to develop a first color of a plurality of colors;

a second developing device configured to develop a second color of the plurality of colors;

a third developing device configured to develop a third color of the plurality of colors;

a temperature sensor configured to measure a temperature of the first developing device; and a controller comprising a processor and a memory, the controller configured to:

obtain a threshold value regarding the temperature of the first developing device;

stop development performed by the first developing device based on a comparison between the temperature of the first developing device and the threshold value; and operate the second developing device to perform development when the first developing device is stopped.

12. The image forming apparatus of claim 11, wherein the controller is configured to operate the third developing device to perform development when the first developing device is stopped.

13. The image forming apparatus of claim 11, wherein the controller is configured to:

determine whether to operate the second developing device when the first developing device is stopped; and operate the second developing device to perform development based on the determination.

14. The image forming apparatus of claim 11, wherein the controller is configured to:

receive a selection of a color from a subset of the plurality of colors that are developable when the first developing device is stopped; and operate the second developing device to perform development of the color from the subset of the plurality of colors.

15. The image forming apparatus of claim 11, wherein the controller is configured to operate the second developing device and the third developing device when the first developing device is stopped, and wherein the second developing device and the third developing device are configured to develop the first color.

16. The image forming apparatus of claim 11, wherein the controller is configured to: resume development via the first developing device based on a comparison between the temperature of the first developing device and the threshold value.

17. The image forming apparatus of claim 11, wherein the controller is configured to acquire, via the temperature sensor, a temperature of the first developing device based on a temperature of the image carrier.

18. A method, comprising:

obtaining, via a processor of an image forming apparatus, a threshold value regarding the temperature of a first developing device of a plurality of developing devices;

stopping, via the processor, development performed by the first developing device based on a comparison between the temperature of the first developing device and the threshold value; and operating, via the processor, a second developing device of the plurality of developing devices to perform development when the first developing device is stopped.

19. The method of claim 18, further comprising determining, via the processor, whether to operate the second developing device when the first developing device is stopped; and operating, via the processor, the second developing device to perform development based on the determination.

20. The method of claim 18, further comprising determining, via the processor, whether to operate the second developing device when the first developing device is stopped; and operating, via the processor, the second developing device to perform development based on the determination;

wherein the threshold value comprises a first threshold value and a second threshold value.

* * * * *